Patented Oct. 12, 1926.

1,602,850

UNITED STATES PATENT OFFICE.

GEORGE W. HEISE, OF BAYSIDE, NEW YORK, ASSIGNOR TO NATIONAL CARBON COMPANY, INC., A CORPORATION OF NEW YORK.

CARBON FOR DEPOLARIZING COMPOSITIONS AND PROCESS OF CONDITIONING THE SAME.

No Drawing.    Application filed December 19, 1922.    Serial No. 607,908.

This invention relates to improvements in carbon-containing depolarizing compositions, and to milling processes for preparing the constituents of such compositions. An essential feature of the invention is the milling of carbon with a substance which operates to put the carbon in a condition well adapted for use with depolarizing compounds, such as manganese dioxid.

In the application of William R. Clymer, Serial No. 410,923, filed Sept. 17, 1920, patented Jan. 8, 1924, No. 1,480,533, there is described and claimed a process wherein carbon and manganese depolarizer are jointly milled, giving a mixture which is materially higher in depolarizing value than any product which can be made by singly grinding or milling the components for an equal period of time, or to the same general order of fineness, and thereafter thoroughly commingling the ground materials. The theory is advanced in that application that the process described causes the carbon to coat the manganese dioxid particles, and my investigations support the correctness of such theory.

I have found, however, that the prolonged milling of the manganese depolarizer which is required by said Clymer process is objectionable in some cases in that the manganese material is itself comminuted to a greater degree than is necessary, especially if a soft or friable grade of manganese is used. In accordance with my invention, there are produced depolarizing compositions in which the manganese particles are believed to be coated with carbon in much the same way as when the carbon and manganese are jointly milled, but this result may, if desired, be attained without prolonged milling of the manganese material.

My process involves the milling of the conductive carbonaceous material, for example highly calcined petroleum coke, which is to be used in the depolarizing composition, with a material which is adapted to put the carbon in a condition which enables it to cooperate with a manganese depolarizer to give a composite of maximum depolarizing efficiency. I am unable to state precisely what this condition is, but on the assumption that the best results are obtained when the manganese particles are coated with carbon, I believe that in my process the carbon is converted into a form which enables it to attach itself with greater facility to manganese particles.

In the preferred form of the present process, the conductive carbonaceous material is milled with sand or other non-depolarizing material such as those hereinafter referred to. A ball mill or any other suitable type of grinding apparatus may be used. Good results are not usually obtained when the sand or the like constitutes less than 10% of the weight of the charge. Any desired amount of sand or the like in excess of 10% may be used, and relatively large amounts facilitate the operation. However, when the product is to be used without separation of the sand or the like as a component of dry cell deoplarizing composition, as subsequently described, the sand or the like should not in general exceed 25 or 30% of the weight of the charge.

The duration of the milling operation will vary considerably with the type of mill used, the proportions and physical properties of the sand or the like and of the carbon, and other conditions. In grinding a charge composed of 100 parts by weight of nodular highly calcined coke in admixture with about 25 parts of sand, using a pebble mill, milling for 2 to 4 hours generally suffices to put the carbon into excellent condition for depolarizing use. When sand is used, I prefer to leave it in admixture with the carbon, as sand is not detrimental to depolarizing compositions but on the contrary has certain positive advantages. Among these are the replacement by the sand of a portion of the relatively expensive depolarizer and carbon. In a standard depolarizing composition consisting of about 1 part by weight of conductive carbon to 3 parts of manganese compound, the sand may replace either a portion of the carbon or of the manganese compound, or the replacement may be distributed between the two. In general, however, I prefer that the sand shall replace part of the manganese compound only, as a relatively high percentage of carbon is advantageous and an ample amount of the manganese compounds remains to insure the effective operation of the cell.

The replacement by sand may be so regulated that there is no objectionable increase in the resistance of the depolarizing composition when used in cells, probably because the milling with carbon covers the sand particles with a conductive carbonaceous coating. If the proportion of sand is largely increased, the resistance is augmented, and advantage may be taken of this fact in preparing cells in which a relatively high internal resistance is desirable.

After the carbon has been sufficiently milled with the sand, the carbon appears to be in a condition which enables it to attach itself to manganese particles with great readiness, and upon adding the manganese material in a proper state of subdivision to the mixture of carbon and sand, and thoroughly mixing, a depolarizing composition of very high efficiency is produced. I have not determined the exact condition in which the carbon exists after milling it with the sand or the like, but I regard it as possible that during the milling operation, the sand particles become coated with a film of carbon which may be transferred to the manganese particles by some sort of selective action when the manganese material is subsequently added.

I may add the manganese depolarizer to the mill either at the beginning, or during the course of the joint milling of the carbon and sand. With some grades of manganese, this method gives better results than I have obtained in any other way, possibly because the manganese is then coated both directly and through the intervention of the inert particles, the coating process being more rapid and thorough because of such combined effect. I prefer, however, to have the manganese only about fine enough to pass a 100 mesh screen, and many soft varieties become too fine if milled for a period long enough to reduce the maximum proportion of the carbon to a coat-forming condition.

The following comparative statement shows the beneficial results of the improved depolarizing product, as measured by the life of flashlight cells on 2¾ ohm continuous service to 0.5 volts:

| Depolarizing composition. | Service life of cells. |
|---|---|
| | Minutes. |
| Manganese ore and coke, milled together | 565 |
| Manganese ore, sand, and coke milled together | 590 |
| Sand and coke milled, then mixed with ground manganese ore | 580 |

In the above tests, 100 parts by weight of carbonaceous material, 30 parts of sand, and 260 parts of manganese ore were used. The ore mixed with the separately milled carbon product was ground to pass a 100 mesh screen.

It will be seen from the above table that the essential condition for improved results is the milling of the carbonaceous material with the sand or the like. With the particular manganese ore used in the above test, a slight further improvement was shown when the ore was also included in the joint milling. When milled in the presence of a material such as sand, manganese ores are comminuted at a faster rate than when milled alone. For this reason it is often desirable to utilize the sand as a manganese-comminuting agent as well as a carbon-filming agent. By some such expedient as adding the manganese during the milling operation, but at an advanced stage thereof, it is usually possible to avoid too great a comminution of the manganese material.

The invention is not limited to any particular form of conductive carbon. Graphite of good quality may be used with excellent results. Cheaper forms of carbon, however, when prepared by the process described, give results in depolarizing mixtures comparable to those obtained with such graphite. An important advantage of the invention resides in the fact that low grade carbons of relatively high electrical resistance, and other objectionable qualities, are thus made available for use. For example, it is well known in the art that certain types of graphite, while they may be used with some degree of success in large cells, are not suitable for miniature or flashlight cells. Such graphite when prepared in accordance with the present invention is well adapted for any depolarizing use.

Other materials than sand may be milled with the carbon to produce the improved composition. Most solid substances are harder than the conductive forms of carbon suitable for depolarizing compositions, or at any rate are capable of withstanding the milling operation sufficiently to permit the survival of nuclei around which carbon films may form. All such substances, if non-injurious in battery cells, are suitable. Even if undesirable in the cell, they may sometimes be used and separated from the carbon before the latter is placed in the cells. For example, soluble salts may replace the sand, and may be dissolved out after the milling operation. The films of carbon thus released appear to retain their capability of attaching themselves readily to particles of depolarizer. Solid zinc-ammonium chlorid may be used and since this salt is universally used in dry cells, it need not be removed after the milling.

The term "relatively hard material" as used in the claims, includes all materials which possess properties adapting them to withstand attrition to such a degree that when they are jointly milled with conductive carbon, sufficient particles of the carbon-conditioning material survive to bring the carbon into a condition wherein it readily attaches itself to manganese dioxid particles.

My invention does not include a joint milling in which only manganese and carbon are present, but on the contrary comprises a process wherein the manganese need not be subjected to prolonged milling.

Cells containing depolarizing compositions prepared in accordance with the present invention are in general characterized by a greater current output on continuous discharge, and by more service on intermittent test, than cells made up with manganese oxid-carbon depolarizers in which the ingredients are separately comminuted in the usual manner. The improved service may be caused by a number of characteristics resulting from the process described, including the conductivity imparted to the depolarizing oxid particles by the carbonaceous coating in which they are encased and by the high moisture absorption capacity of the depolarizer-carbon-sand mix.

I am aware that inert materials have heretofore been used in depolarizing compositions, but simple admixture of such materials with depolarizing compounds, as in prior processes, will not secure the beneficial results of the present invention.

I claim:

1. Process of conditioning conductive carbon for use in depolarizing compositions which comprises milling the carbon with a relatively hard, powdered, non-depolarizing material.

2. Process of conditioning conductive carbon for use in depolarizing compositions which comprises milling the carbon with sand.

3. Process of preparing a depolarizing composition which comprises milling together carbonaceous material, an oxid depolarizer and a relatively hard, powdered, non-depolarizing material.

4. Process of preparing a depolarizing composition which comprises milling together carbonaceous material, an oxid depolarizer and sand.

5. Process of conditioning highly calcined coke for use in depolarizing compositions, which comprises milling the coke with a relatively hard, powdered, non-depolarizing material.

6. Process of conditioning highly calcined coke for use in depolarizing compositions which comprises milling the coke with sand.

7. Process of preparing a depolarizing composition which comprises milling together highly calcined coke, an oxid depolarizer and a relatively hard, powdered, non-depolarizing material.

8. Process of preparing a depolarizing composition which comprises milling together highly calcined coke, an oxid depolarizer and sand.

9. As an ingredient of a depolarizing composition, conductive carbonaceous material in a physical condition such as can be produced by prolonged milling with a relatively hard, powdered, non-depolarizing material.

10. As an ingredient of a depolarizing composition, highly calcined coke in a physical condition such as can be produced by prolonged milling with a relatively hard, powdered, non-depolarizing material.

11. A mixture comprising a relatively hard, powdered, non-depolarizing material and conductive carbon in a physical condition and state of association such as can be produced by prolonged joint milling.

12. A mixture comprising a relatively hard, powdered, non-depolarizing material and highly calcined coke in a physical condition and state of association such as can be produced by prolonged joint milling.

13. A depolarizing composition comprising an oxid depolarizer and conductive carbon, said carbon being in a physical condition such as can be produced by prolonged milling with a relatively hard, powdered, non-depolarizing material.

14. A depolarizing composition comprising an oxid depolarizer and highly calcined coke, said coke being in a physical condition such as can be produced by prolonged milling with a relatively hard, powdered, non-depolarizing material.

In testimony whereof, I affix my signature.

GEORGE W. HEISE.